(12) United States Patent
Fowell

(10) Patent No.: US 8,041,118 B2
(45) Date of Patent: Oct. 18, 2011

(54) PATTERN RECOGNITION FILTERS FOR DIGITAL IMAGES

(75) Inventor: Richard A. Fowell, Rolling Hills Estates, CA (US)

(73) Assignee: The Boeing Company, Chicago, IL (US)

( * ) Notice: Subject to any disclaimer, the term of this patent is extended or adjusted under 35 U.S.C. 154(b) by 1163 days.

(21) Appl. No.: 11/707,674

(22) Filed: Feb. 16, 2007

(65) Prior Publication Data

US 2008/0199077 A1     Aug. 21, 2008

(51) Int. Cl.
    *G06K 9/00* (2006.01)
(52) U.S. Cl. ............. 382/181; 244/158.1; 382/276; 382/294
(58) Field of Classification Search ............. 244/158.1; 382/107, 181, 190, 250, 276
    See application file for complete search history.

(56) References Cited

U.S. PATENT DOCUMENTS

| | | | |
|---|---|---|---|
| 5,223,702 A | 6/1993 | Conley | |
| 5,291,560 A | 3/1994 | Daugman | |
| 5,706,416 A | 1/1998 | Mann et al. | |
| 6,102,338 A | 8/2000 | Yoshikawa et al. | |
| 6,227,496 B1 | 5/2001 | Yoshikawa et al. | |
| 6,236,939 B1 | 5/2001 | Wu et al. | |
| 6,241,288 B1 | 6/2001 | Bergenek et al. | |
| 6,266,216 B1 | 7/2001 | Hikami et al. | |
| 6,470,270 B1 | 10/2002 | Needelman et al. | |
| 6,512,979 B1 | 1/2003 | Needelman et al. | |
| 6,522,768 B1 * | 2/2003 | Dekhil et al. ............. | 382/100 |
| 6,523,786 B2 | 2/2003 | Yoshikawa et al. | |
| 6,766,227 B2 | 7/2004 | Needelman et al. | |
| 6,785,427 B1 * | 8/2004 | Zhou ............. | 382/294 |
| 7,038,710 B2 * | 5/2006 | Caviedes ............. | 348/180 |
| 7,136,752 B2 | 11/2006 | Needelman et al. | |
| 7,260,456 B2 | 8/2007 | Fowell et al. | |
| 7,650,016 B2 * | 1/2010 | Gold, Jr. ............. | 382/107 |
| 7,764,844 B2 * | 7/2010 | Bouk et al. ............. | 382/250 |
| 2008/0069445 A1 * | 3/2008 | Weber ............. | 382/181 |
| 2008/0199077 A1 * | 8/2008 | Fowell ............. | 382/190 |

OTHER PUBLICATIONS

Polle, B., et al., "Autonomous On-Board Navigation for Interplanetary Missions (AAS 03-023)," 26th Annual AAS Guidance and Control Conference, Feb. 5-9, 2003, pp. 277-293, American Astronautical Society, San Diego, California, USA.

Jeffrey N. Blanton, "A New Collapsing Technique for Star Identification Using Sensors with Nonsimultaneous Acquisition Times (ADA096242)," Oct. 1980, 13 pages, Navel Surface Weapons Center, Dahlgren, Virginia, USA.

(Continued)

*Primary Examiner* — Gregory M Desire
(74) *Attorney, Agent, or Firm* — Toler Law Group

(57) ABSTRACT

In an exemplary embodiment, a pattern is recognized from digitized images. A first image metric is computed from a first digitized image and a second image metric is computed from a second digitized image. A composite image metric is computed as a function of the first image metric and the second image metric, and a pattern is identified by comparing the composite image metric against a reference image metric. The function may be a simple average or a weighted average. The image metric may include a separation distance between features, or a measured area of a feature, or a central angle between two arcs joining a feature to two other features, or an area of a polygon whose vertices are defined by features, or a second moment of a polygon whose vertices are defined by features. The images may include without limitation images of friction ridges, irises, or stars.

98 Claims, 10 Drawing Sheets

OTHER PUBLICATIONS

Jeffrey N. Blanton, "The Application of a State Transition Matrix Solution for the Rotational Motion of a Satellite to Star Identification (AAS 81-171)," Aug. 1981, 12 pages, vol. 46, Part II, Advances in the Astronautical Sciences, Astrodynamics Conference, North Lake Tahoe, Nevada, USA.

Meng Na and Peifa Jia, "A survey of all-sky autonomous star identification algorithms," Systems and Control in Aerospace and Astronautics, Jan. 2006, pp. 896-901.

Kara M. Huffman, "Designing Star Trackers to Meet Micro-satellite Requirements," May 26, 2006, 187 pages, Master of Science in Aeronautics and Astronautics at the Massachusetts Institute of Technology.

Jean Claude Kosik, "Star Pattern Identification Aboard an Inertially Stabilized Spacecraft," Centre National d'Etudes Spatiales, pp. 230, vol. 14, No. 2, Toulouse, France.

James R. Wertz, "Spacecraft Attitude Determination and Control," Copyright © 1978, pp. 424-428 and 259-266, Kluwer Academic Publishers, Dordrecht, The Netherlands.

Keith Price, "Annotated Computer Vision Bibliography: Table of Contents," http://iris.usc.edu/Vision-Notes/bibliography/contents.html, last update: Jun. 25, 2008, 1 page.

Jon Holtzman, "Basic Principles and Properties," http://ganymede.nmsu.edu/holtz/a535/ay535notes/node48.html, Dec. 7, 2007, 2 pages.

Jon Holtzman, "CCDs," http://ganymede.nmsu.edu/holtz/a535/ay535notes/node49.html, Dec. 7, 2007, 1 page.

John Biretta and Michael S. Wiggs, "WFPC2 Data Reduction / Technical Issues," http://www.stsci.edu/ftp/science/hdfsouth/reduc_wfpc2.html, last updated on Nov. 24, 1998, 5 pages.

A. S. Fruchter and R. N. Hook, "Linear Reconstruction of the Hubble Deep Field," http://www-int.stsci.edu/~fruchter/dither/drizzle.html, Sep. 15, 1996, 7 pages.

Zomet et al., Robust Super-Resolution, School of Computer Science and Engineering, The Hebrew University of Jerusalem, 2001 IEEE.

Kuehl et al., Micro-Tech.-Sensor for Attitude and Orbit Determination, AAS 03-001, 26th AAS G&C Conference, Feb. 2003.

Bae et al., Precision Attitude Determination (PAD), Geoscience Laser Altimeter System (GLAS)—Algorithm Theoretical Basis Document-Version 2.2, Center for Space Research, The University of Texas at Austin, Oct. 2002.

Airey et al., Seeing Through Dust—Tracking Stars from within a Cometary Dust Cloud, AAS 03-022, 26th AAS G&C Conference, Feb. 2003.

Whirlpool Galaxy Image, http://www.whirlpoolgalaxy.com/image_stacking.html, Astrophotography of Jay Potts, viewed May 24, 2011.

Image Stacker Help, http://www.tawbaware.com/is_help/imgstack_help.htm, viewed May 24, 2011.

Rao et al., Incremental-Angle and Angular Velocity Estimation Using a Star Sensor, Journal of Guidance, Control, and Dynamics, vol. 25-No. 3, May-Jun. 2002.

Borman et al., Spatial Resolution Enhancement of Low-Resolution Image Sequences—A Comprehensive Review with Directions for Future Research, Laboratory for Image and Signal Analysis (LISA), University of Notre Dame, Indiana, Jul. 8, 1998.

* cited by examiner

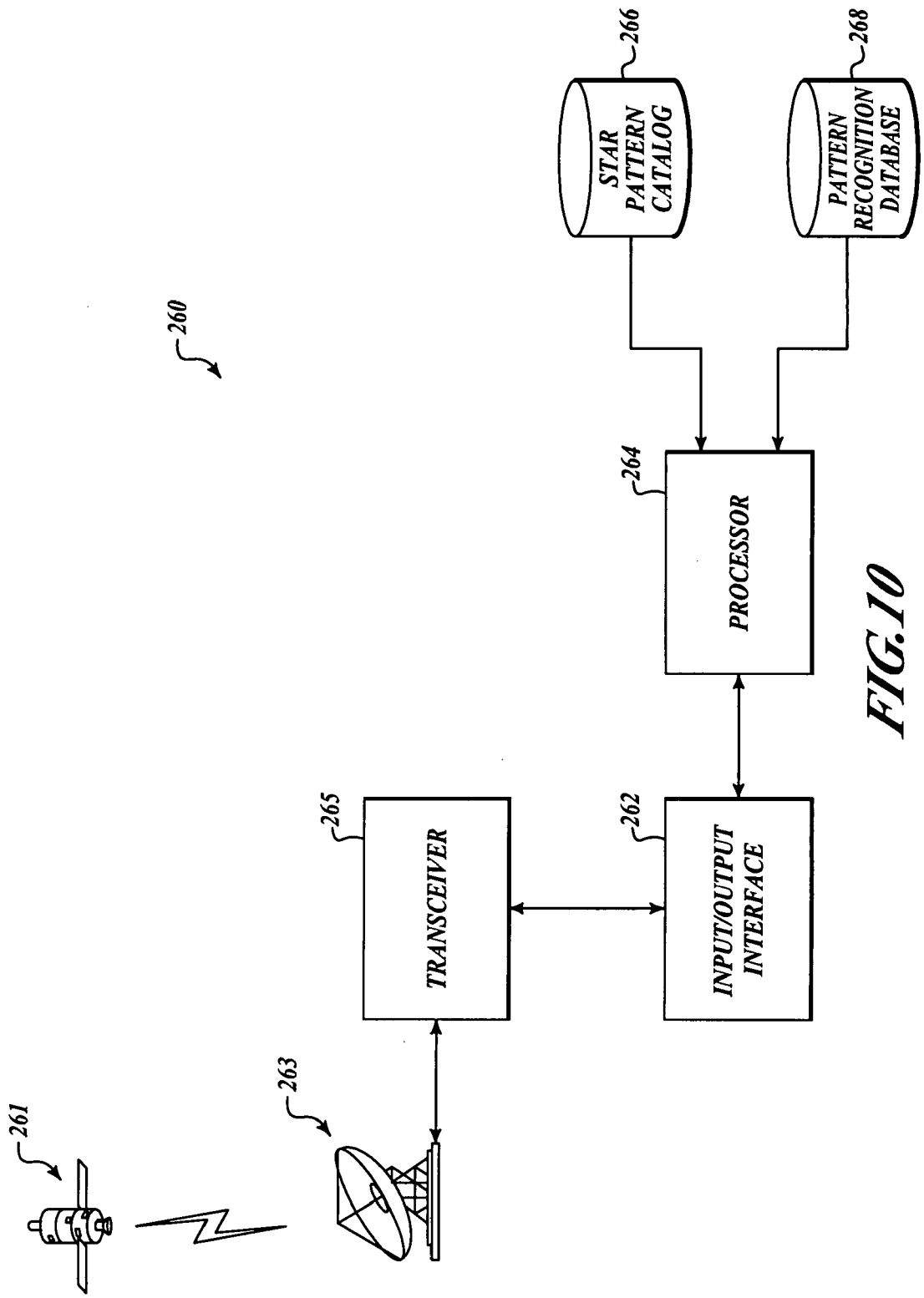

PATTERN RECOGNITION FILTERS FOR DIGITAL IMAGES

STATEMENT REGARDING FEDERALLY SPONSORED RESEARCH OR DEVELOPMENT

An embodiment was made with Government support under Contract No. WITHHELD. The Government has certain rights.

BACKGROUND

Pattern recognition is a method of identification based on recognizing patterns of features in digital images. For example, iris recognition uses an image of the irises of an individual's eyes to identify a person and fingerprint recognition uses an image of friction ridge skin impressions to identify a person. As another example, a spacecraft identifies its orientation in space through recognition of star tracker images of star patterns. Obtaining a desired orientation in space permits a communication satellite to maintain a solar array pointed at the sun for electrical power generation and communication antennas pointed at the earth for radiofrequency communications.

Problems that may be encountered in pattern recognition include ambiguity, false patterns, misidentification, and complexity due to measurement errors and field-of-view limitations. As an example, friction ridge distortion in a fingerprint due to excessive pressing can introduce false patterns. Also, smudges in a fingerprint can introduce measurement errors. As another example, changes in pupil size due to changes in light can introduce false patterns in an iris. Measurement errors can occur in iris measurement if a person to be identified does not hold still and/or look directly into a video camera.

As a further example, a star pattern may be ambiguous if it lies within the measurement error radius of multiple valid star patterns. Ambiguity can also arise when no single star image contains enough stars to form an unambiguous pattern. False identification (aka "False Positives") may arise when nonstellar objects (such as proton flashes, dust particles, satellites, asteroids, or comets) and stars form a pattern which lies within the measurement error radius of a valid star pattern. In these cases the algorithm may mistakenly believe it has correctly recognized a reference pattern. Misidentification (aka "False Negatives") occurs when star measurement errors exceed the value assumed by the star pattern recognition algorithm, thereby causing a star pattern to be outside the measurement error radius assumed by the algorithm. In these cases the algorithm may mistakenly believe that no reference pattern is in the image. Complexity arises when the required number of features for pattern identification is increased (typically causing a polynomial or factorial increase in required memory or computation usage).

Ambiguity, false identification and misidentification can be reduced by reducing the measurement error radius of patterns through reduced star position measurement errors. Star position measurement errors can be reduced by combining data from multiple star images and then averaging the combined data. Ambiguity due to too few stars can be reduced by increasing the effective field of view to include more stars. Combining data from multiple offset star images can increase the effective field of view.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

In an exemplary embodiment, a pattern is recognized from digitized images. A first image metric is computed from a first digitized image and a second image metric is computed from a second digitized image. A composite image metric is computed as a function of the first image metric and the second image metric, and a pattern is identified by comparing the composite image metric against a reference image metric.

According to an aspect, the function may be a simple average or a weighted average.

According to another aspect, the image metric may include a separation distance between features, or a measured area of a feature, or a central angle between two arcs joining a feature to two other features, or an area of a polygon whose vertices are defined by features, or a second moment of a polygon whose vertices are defined by features.

According to a further aspect, the images may include without limitation images of friction ridges, irises, or stars.

According to another exemplary embodiment, a star tracker orientation in space is identified. A first star pattern metric is computed from a first star tracker image, and a second star pattern metric is computed from a second star tracker image. A composite star pattern metric is computed as a function of the first star pattern metric and the second star pattern metric, and matching star patterns are identified by comparing the composite star pattern metric against reference star pattern metrics computed from a star catalogue. Orientation of a star tracker is identified from orientation of the matching star patterns.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 10 is a block diagram of another exemplary system for executing the method of FIG. 7.

DETAILED DESCRIPTION

Given by way of overview, in an exemplary embodiment a pattern is recognized from digitized images. A first image metric is computed from a first digitized image and a second image metric is computed from a second digitized image. A composite image metric is computed as a function of the first image metric and the second image metric, and a pattern is identified by comparing the composite image metric against a reference image metric. The function may be a simple average or a weighted average. The image metric may include a separation distance between features, or a measured area of a feature, or a central angle between two arcs joining a feature to two other features, or an area of a polygon whose vertices are defined by features, or a second moment of a polygon whose vertices are defined by features. Details will be discussed below.

Figure 1:
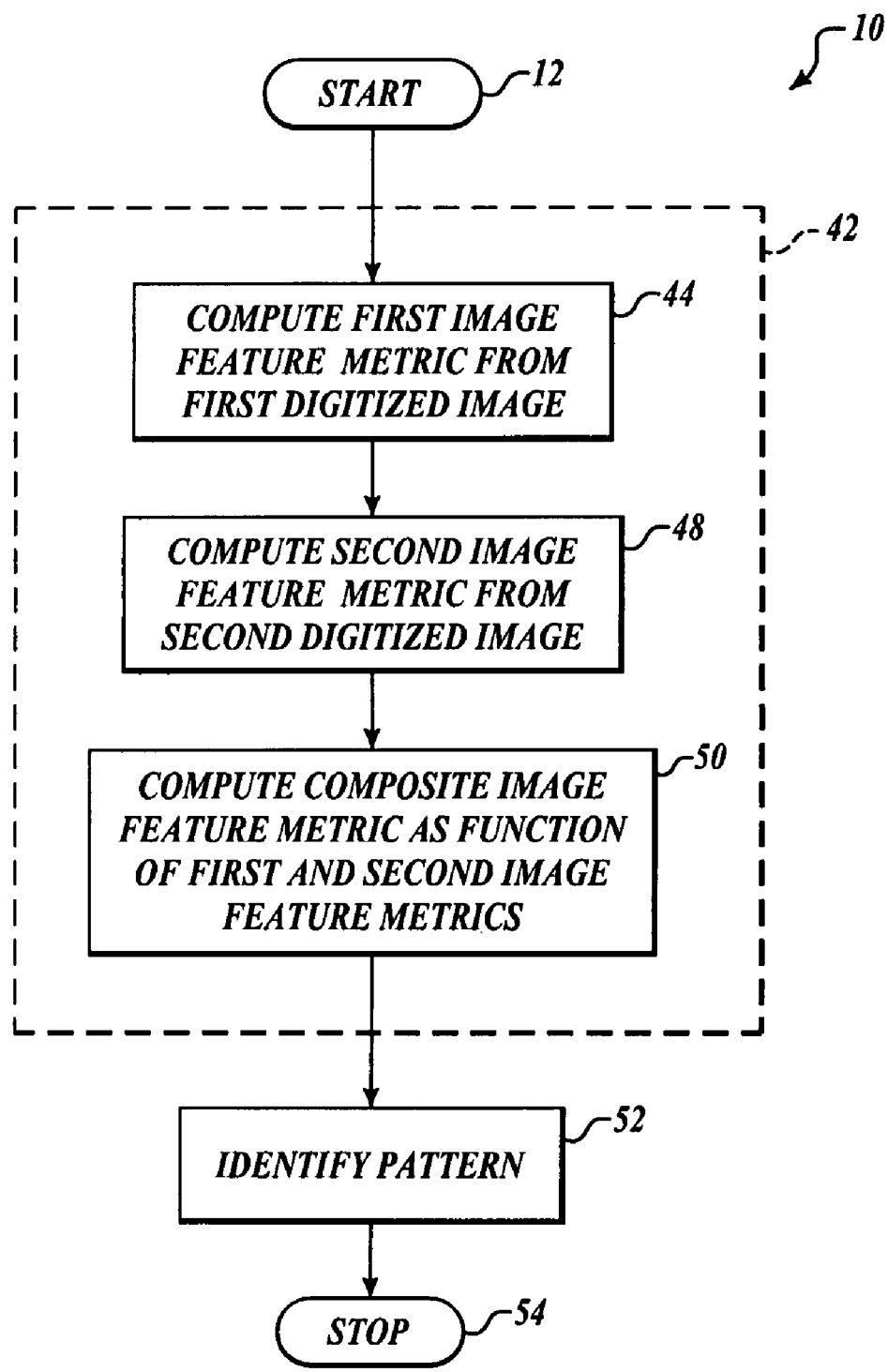
FIG. 1 is a flowchart of an exemplary method of recognizing a pattern from digitized images.

Referring now to FIG. 1, an exemplary method 10 for recognizing a pattern from digitized images starts at a block 12. The images may include without limitation images of friction ridges, irises, or stars.

Figure 2:
FIG. 2 illustrates features of an exemplary fingerprint from a frame of an image.

For example, referring now to FIG. 2, a fingerprint 14 is an impression of friction ridges 16 of all or any part of a finger (or a palm or a toe). A digital image of the fingerprint 14 may be made in any acceptable manner, such as without limitation with a digital camera. Several images of the fingerprint 14 may be taken, such as at a scene of an investigation, thereby providing several frames of digital images.

The friction ridges 16 are raised portions of the epidermis on the palmar or plantar skin, consisting of one or more connected ridge units of friction ridge skin. One of the ridges 16A includes minutiae that are image features that represent points of interest in the fingerprint 14. Given by way of non-limiting example, the ridge 16A includes a short ridge 18 that terminates at a ridge ending 20 and bifurcates into ridges 22 and 24. The ridges 22 and 24 reunite at a ridge ending 26, thereby forming a ridge enclosure 28 having an area $A_{encl}$. Image feature metrics that may be used to numerically measure features of the friction ridges 16 include a separation distance between the ridge endings 20 and 26 or the measured area $A_{encl}$.

Figure 3:
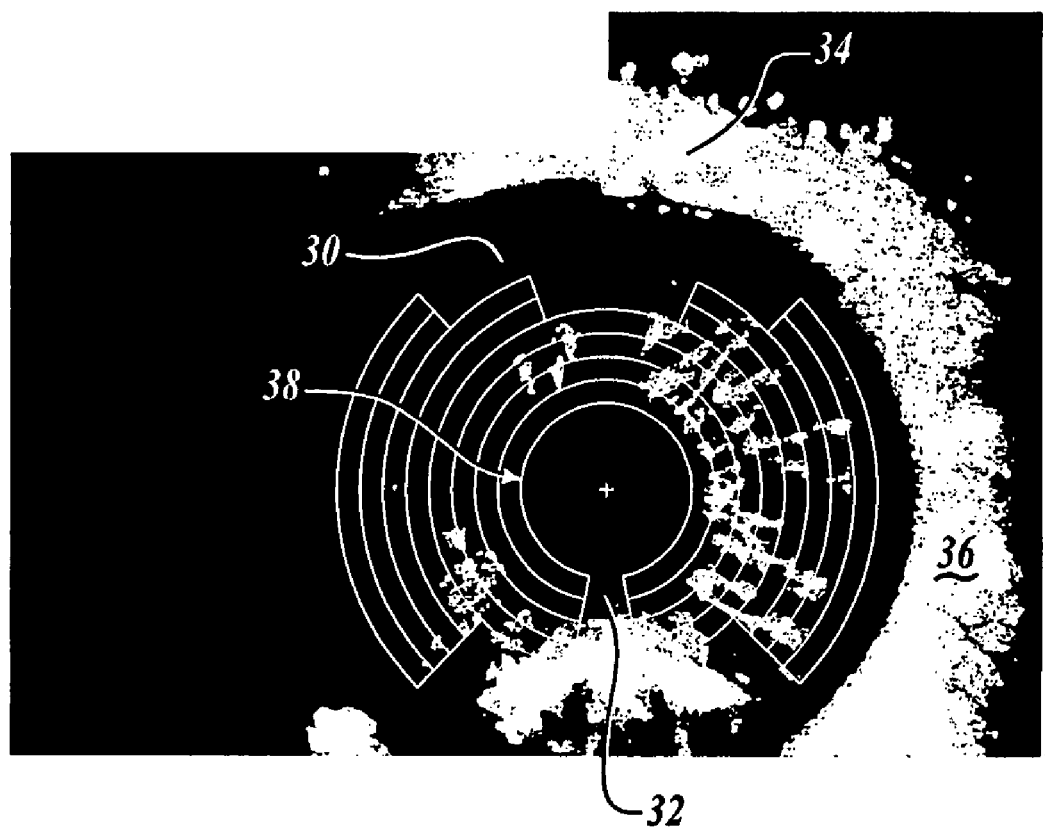
FIG. 3 illustrates features of an exemplary iris from a frame of an image.

As another example and referring now to FIG. 3, an iris 30 surrounds a pupil 32 of an eye 34. Digital images of the iris 30 typically are made with a video camera, thereby providing several frames of digital images.

A sclera portion 36, which is the white portion of the eye 34, in turn surrounds the iris 30. A pupillary boundary 38 separates the pupil 32 from the iris 30. The pupillary boundary 38 is an important image feature that ensures that identical portions of the iris 30 are assigned identical coordinates every time an image is analyzed, regardless of the degree of pupillary dilation. An inner boundary of the iris 30, forming the pupil 32, can be accurately determined by exploiting the fact that the boundary of the pupil 32 is substantially a circular edge. The pupil 32 is generally dark while the iris 30 is lighter, with varied pigmentation. However, this relationship may sometimes be reversed, for example in eyes with dark irises and some cloudiness of the internal lens, or because of optically co-axial illumination (directly into the eye), in which case light is reflected back from the retina and out again through the pupil. A further reason that the image of the pupil 32 may be bright is because of specular reflections from the cornea (not shown).

Figure 4A:
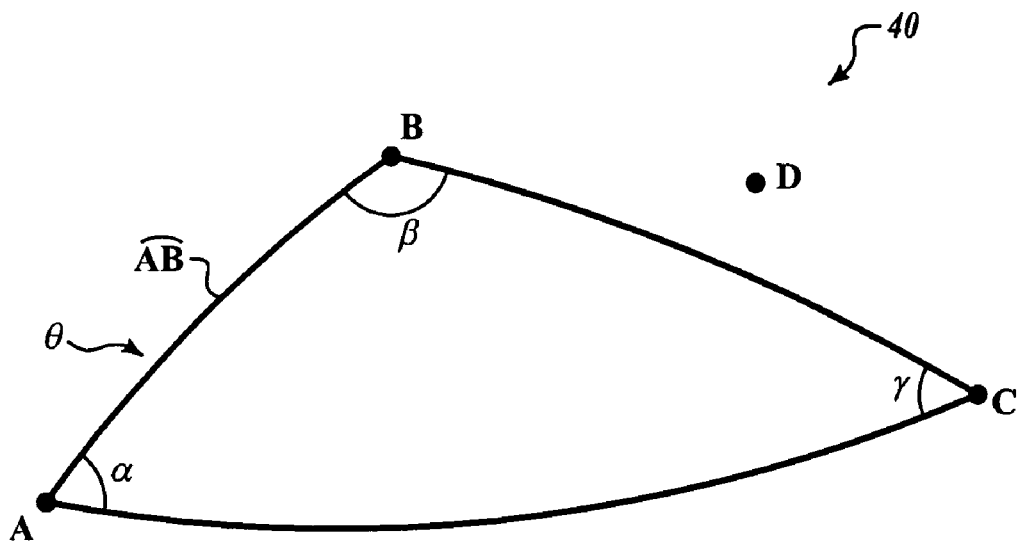
FIGS. 4A and 4B illustrate features of an exemplary star pattern from a frame of a star tracker image.
Figure 4B:
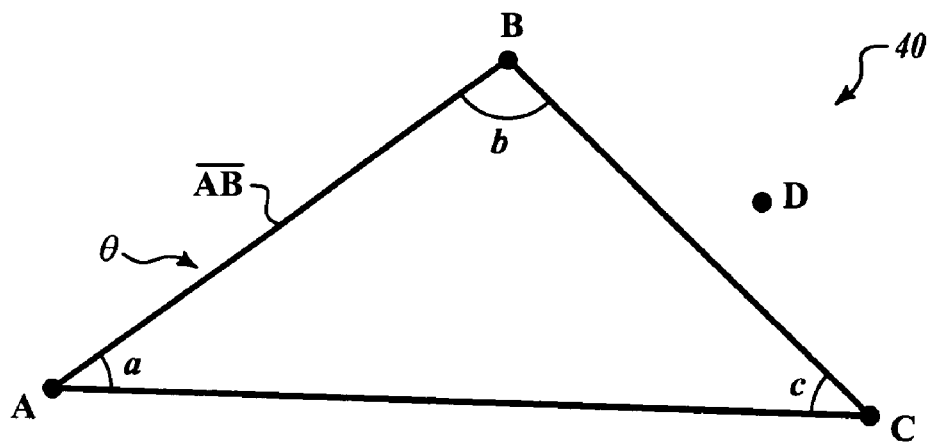

As another example and referring now to FIGS. 4A and 4B, an exemplary, non-limiting star pattern 40 includes stars A, B, and C. A star D is also included in an image of the star pattern 40. The dots shown in FIGS. 4A and 4B represent tips of unit vectors directed from the star sensor (not shown) to the stars A, B, C and D on the surface of a unit sphere. The stars A, B, and C may be considered vertices of a polygon (in this case, a triangle). This triangle may be considered to be a spherical triangle, such as that obtained by connecting the vertices with great circle arcs on the surface of the unit sphere as shown in FIG. 4A, or a planar triangle, such as that obtained by connecting the vertices by straight line segments as shown in FIG. 4B.

The star pattern 40 is imaged by a star sensor, such as a star camera, star tracker, star mapper, fine guidance sensor, or the like. Star sensors typically take low resolution images (between around 0.25 MPixel-1.0 MPixel) at rates between 1-10 images per second. A measurement device of the star sensor may be a charge coupled device (CCD), charge injection device (CID), or active pixel sensor (APS). Intensities are typically measured by generated photoelectrons, digitized into "counts", and often expressed as "instrument magnitudes". Star sensors typically measure intensities and two-dimensional locations (that is, coordinates) of star images. The star sensor's orientation with respect to the stars is often determined from the intensities and coordinates of the star images by pattern matching methods. The projected coordinates are typically reported as Cartesian coordinate (that is, horizontal and vertical) pairs (H,V). However, polar coordinates and spiral mappings may be used, if desired.

Referring back to FIG. 1, at a block 42 image feature metrics are computed from a set of digitized images. Processing in the block 42 results in computation of a composite image feature metric.

Figure 5:
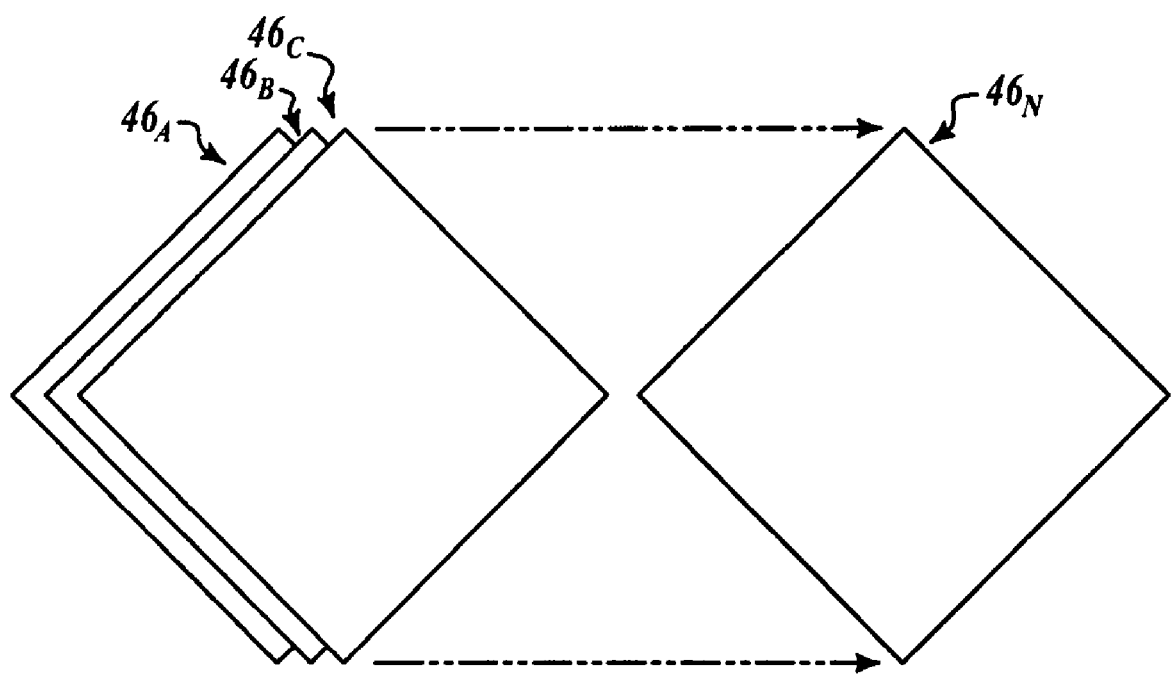
FIG. 5 illustrates multiple frames of images.

Referring additionally to FIG. 5, at a block 44 a metric of a feature in an image $46_A$ is computed. The image $46_A$ may be an image of friction ridges (see FIG. 2), an iris (see FIG. 3), or a star pattern (see FIGS. 4A and 4B). Image features and their metrics may be selected and measured as described below.

For example, referring additionally to FIG. 2, image feature metrics that may be used to numerically measure features of the friction ridges 16 include a separation distance between the ridge endings 20 and 26. Also, the measured area $A_{encl}$ may serve as an image feature metric.

As another example and referring now to FIGS. 1, 3, and 5, image feature metrics that may be used to numerically measure features of the iris 30 include measured brightness of the pupillary boundary 38. The pupillary boundary 38 can be detected as an image feature that presents itself as an abrupt and sudden change in brightness when summed along a circle whose radius is steadily increasing. This sudden change will be maximum if the circle has its center near the true center of the pupil 32, and when its radius matches the true radius of the pupil 32. Thus, finding the pupil 32 can be formulated as an optimization process, in which a series of "exploding circles" (steadily increasing radii) are positioned with their center coordinates located at each one of a number of trial points on a grid. Such an optimization process is described in U.S. Pat. No. 5,291,560, the contents of which are hereby incorporated by reference. For each exploding circle, and for each value of its radius, the total image brightness is summed over a fixed number of points lying on this circle. Using a constant number of points on each circle, typically 128, avoids an automatic increase in the summed brightness simply due to increasing circumference. The system searches for the maximum rate of change in this quantity as radius expands. For the candidate circle that best describes the pupillary boundary 38, there will be a sudden "spike" in the rate-of-change of luminance summed around its perimeter, when its radius just matches that of the pupillary boundary 38. This spike will be larger for a circle that shares the pupil's center coordinates and radius than for all other circles.

As a further example and referring now to FIGS. 1, 4A, 4B, and 5, most star pattern matching methods use star pattern metrics which are functions of the locations and/or intensities of multiple stars. The non-limiting star pattern 40 illustrates some exemplary metrics. An exemplary metric is separation between star pairs. For example, an arc AB represents a separation metric between a star pair AB. Many separation metrics may be used as desired for the separation between star pairs. A numerical value used for the separation metric AB could be proportional to an angle $\theta$ (in radians) between the unit vectors to star A and star B. Further, the separation metric AB may be proportional to $\cosine(\theta)$, $\sine(\theta)$, $2\sine(\theta/2)$, $\tangent(\theta)$, $(\sine(\theta))^2$, $(\cosine(\theta))^2$, or other suitable functions of $\theta$.

Another exemplary star pattern metric is an included angle in star triplets. The included angle may be a spherical angle between great circle arcs or a planar angle between vectors. For example and referring to FIG. 4A, a spherical angle $\alpha$ represents an included angle metric of an interior angle of the star triplet BAC; a spherical angle $\beta$ represents an included angle metric of an interior angle of the star triplet ABC; and a spherical angle $\gamma$ represents an included angle metric of an interior angle of the star triplet ACB. As a further example and referring to FIG. 4B, a planar angle a represents an angle between vectors B-A and C-A; a planar angle b represents an angle between vectors A-B and B-C; and a planar angle c represents an angle between vectors A-C and C-B.

Numeric metrics will be discussed using the spherical angle $\alpha$ and the planar angle a as non-limiting examples. For example, a number used for an interior angle metric could be proportional to the spherical angle $\alpha$ (FIG. 4A) between great circle arcs AB and AC or to the planar angle a (FIG. 4B) between vectors B-A and C-A. Similarly, the number could be proportional to $\cosine(\alpha)$, $\cosine(a)$, $\sine(\alpha)$, $\sine(a)$, $2\sine(\alpha/2)$, $2\sine(a/2)$, $\tangent(\alpha)$, $\tangent(a)$, $(\sine(\alpha))^2$, $(\sine(a))^2$, $(\cosine(\alpha))^2$, or $(\cosine(a))^2$.

Other properties (such as without limitation spherical area, spherical second moment (such as the spherical polar moment), planar area, planar second moment (such as the planar polar moment), singular values, convex hull) of star polygons may be used for star pattern matching, as desired. Other approaches, including neural network methods or genetic algorithms, use "feature vectors" which are functions of the star separation metrics and interior angle metrics of groups of stars.

Referring now to FIGS. 1-5, at a block 48 the metric that was computed for the feature in the image $46_A$ is computed for the same feature in an image $46_B$. For example, the image $46_B$ may be another image of the friction ridges 16 (FIG. 2) that may be taken at a scene of an investigation. As another example, the image $46_B$ may be a later frame from video images of the iris 30 (FIG. 3). As a further example, the image $46_B$ may be a later frame from star sensor images of the star pattern 40 (FIGS. 4A and 4B).

If desired, at the block 48 the metric that was computed for the feature in the image $46_A$ may be computed for the same feature in additional images, such as an image $46_C$. The metric for the feature may be computed for as many additional images $46_N$ as desired. The more images from which the metric is computed will yield more accuracy in a composite metric. However, increased accuracy will be balanced against increases in processing power and capabilities (and attendant increases in power consumption and weight).

At a block 50, a composite image feature metric is computed as a function of the metrics of the feature from the images $46_A$ and $46_B$ (and optionally any additional images $46_C$ through $46_N$, as desired). The function suitably is a filter function. For example, the filter may implement an average, such as a simple average or a weighted average. Additional filtering may be performed, if desired. For example, an outlier filter, such as a median filter, may be used to remove outliers. As another example, the filter may assess variance of uncorrelated errors in the metric.

Thus, the metrics have already been computed in each image 46A and 46B at the blocks 44 and 48 (and, if desired any additional images 46C through 46N). It is at the block 50 that filtering is applied to the metrics (instead of computing metrics from filtered image features). In combining metrics from different image frames, it will be appreciated that the same feature (such as the same iris, or friction ridge, or set of stars) is measured by the metric in the image frames being combined. For example, stars are typically matched up from one star tracker frame (image) to the next by checking for a star image whose position, magnitude, and/or (occasionally) shape is that predicted by extrapolation from prior frames. Stars that fail these consistency checks are typically marked as "invalid" and not used. This checking can be done in the star tracker itself, in flight computer processing software, or both. In the presence of proton radiation, especially during a solar storm, or when traversing a radiation belt, the number of star images that are corrupted by protons is high enough that such consistency measures are extremely useful.

In addition and if desired, at the block 50 metrics that are not available in any single image frame may be combined. For example, the properties of a triangle formed by three stars can be assembled even though only two of the three stars were marked valid in any single frame. Then the refined metrics are made available to subsequent star pattern recognition processing.

At a block 52, a pattern is identified. The composite metric computed at the block 50 of the image feature is compared against a reference image feature metric in a suitable manner for the image feature being identified. For example, a composite metric for a feature of a friction ridge (as described above) may be compared in a known manner against reference metrics for features of fingerprints within an Integrated Automated Fingerprint Identification System (IAFIS) database maintained by the United States Federal Bureau of Investigation (FBI) or a US-VISIT repository maintained by the United States Department of Homeland Security. As another example, a composite metric for a feature of an iris (as described above) may be compared in a known manner (such as that taught in U.S. Pat. No. 5,291,560, the contents of which are hereby incorporated by reference) against reference metrics for features of irises, such as those that are maintained by the United Kingdom's Iris Recognition Immigration System (IRIS), the United Arab Emirates border control iris database, or the Netherlands iris recognition database for Schiphol Airport.

As a further example, star pattern recognition processing may be any acceptable known star pattern recognition processing. However, it would be desirable for the star pattern recognition processing to take advantage of metric measurement error assessment to determine if the identified pattern meets the desired level of confidence. An exemplary star pattern identification includes processing a list of tracked stars from a star tracker frame (image), including the measured magnitude, horizontal (H) and vertical (V) position of each star in the star tracker field of view. Metrics of measured stars bright enough to be in a star catalog (such as: angular separation between each star pair; included angle between the great circle arcs from a central star to two other stars; spherical angle subtended by the spherical triangle formed by three stars; measured area of a polygon formed by stars; measured brightness of a star; and the like) have been used to create a candidate list of star pairs (j) from a precalculated list of star metrics. The candidate list is the list of catalog stars whose precalculated metric is the measured metric plus-or-minus the measured uncertainty.

Using star pair separation as a non-limiting example, for each star pair (j) on the candidate list, the star catalog is searched to see if any catalog star separations match the measured star pair separations to the uncertainty in the measurement. If all the measured star positions pass this test, and the number of confirmed star pair measurements is sufficiently high as to be unlikely to be attributable to chance, then a pattern is considered to be identified.

After a pattern is identified at the block 52, processing of the method 10 stops at a block 54.

Figure 6:
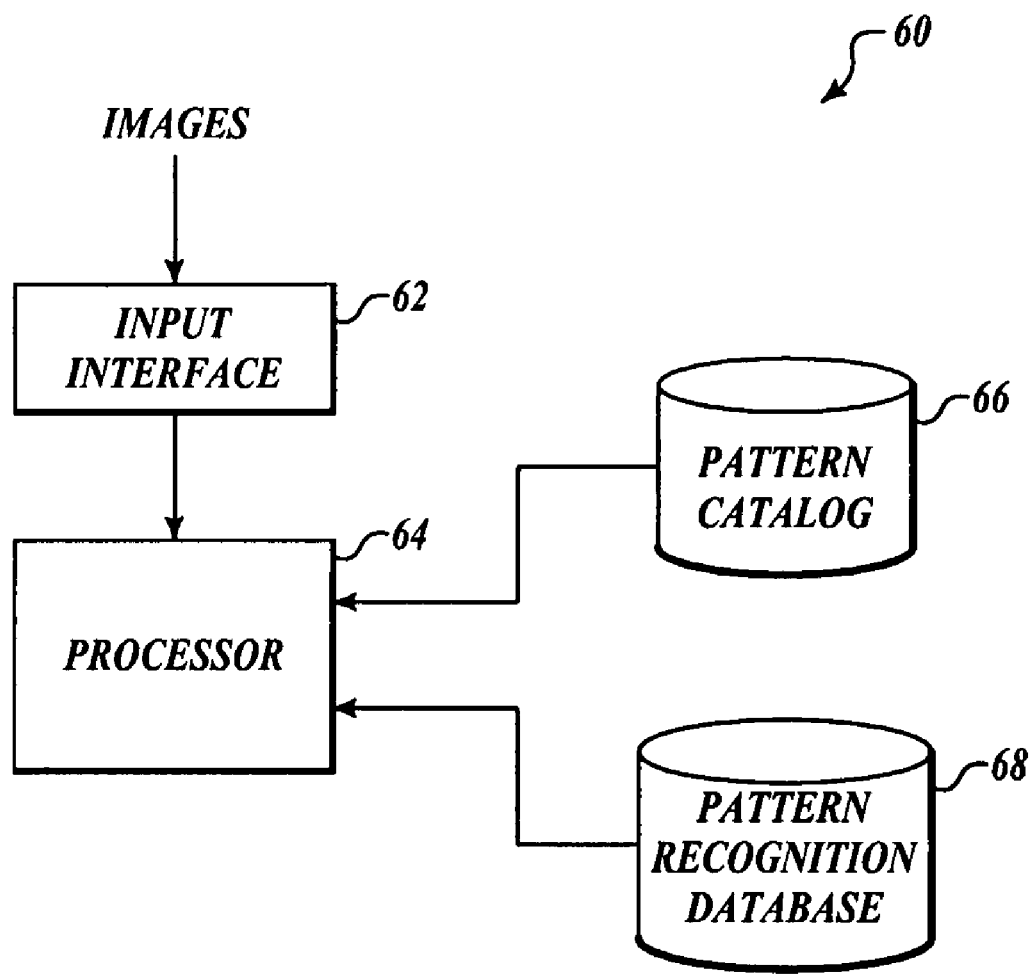
FIG. 6 is a block diagram of an exemplary system for executing the method of FIG. 1.

Referring now to FIG. 6, an exemplary system 60 recognizes a pattern from digitized images. To that end, the system 60 is well-suited for executing the method 10 (FIG. 1).

An input interface 62 receives the images $46_A$, $46_B$, and any additional images $46_C$ through $46_N$ (FIG. 5) (or data regarding the images) from a source of the images. For example, the input interface 62 may receive images of the friction ridges 16 (FIG. 2), frames of video images of the iris 30 (FIG. 3), or star sensor images of the star pattern 40 (FIG. 5). The input interface 62 suitably is any appropriate interface for a desired application. For example, the input interface 62 may include without limitation a serial interface, a parallel interface, a USB interface, or the like. Input interfaces are known in the art, and a detailed discussion of their construction and operation is not necessary for embodiments described herein.

A processor 64 processes information received from the input interface 62. The processor 64 suitably is any computer processor or computer processors, or processing component or components, such as a microprocessor, that is configured to perform filtering processes, such as simple averaging, weighted averaging, median filtering, variance assessment, pattern matching, and the like. As such, the processor 64 executes processing of the blocks 42 (including the blocks 44, 48, and 50) and 52 (all FIG. 1). Thus, the processor 64 is configured to compute an image metric of an image feature from the image $46_A$ and an image metric of the same image feature from the image $46_B$ (and any other images $46_C$ through $46_N$) (all FIG. 5). The processor 64 also is configured to compute a composite image metric as a function of the feature metric from the image $46_A$ and the feature metric from the image $46_B$ (and any other images $46_C$ through $46_N$). Finally, the processor 64 is configured to identify a pattern by comparing the composite image metric against a reference image metric.

A pattern catalogue 66 is a repository or database of patterns of images may represent a matching pattern. The pattern catalogue 66 resides in a suitable storage device that is accessible by the processor 64 in a known manner. As discussed above, the pattern catalogue may be a repository of friction ridge images, iris images, or star patterns.

A pattern recognition database 68 is a listing of image feature metrics, such as metrics of friction ridge lines or friction ridge areas, or brightnesses of papillary boundaries. In the context of star patterns, the pattern recognition database can include: identifications of pairs of stars (by star names or numbers) and a list of star separations; and/or identifications of star triplets and a list of angles defined thereby; and/or identifications of stars in polygons (such as triangles) and areas thereof. The pattern recognition database 68 resides in a suitable storage device that is accessible by the processor 64 in a known manner.

Figure 7:
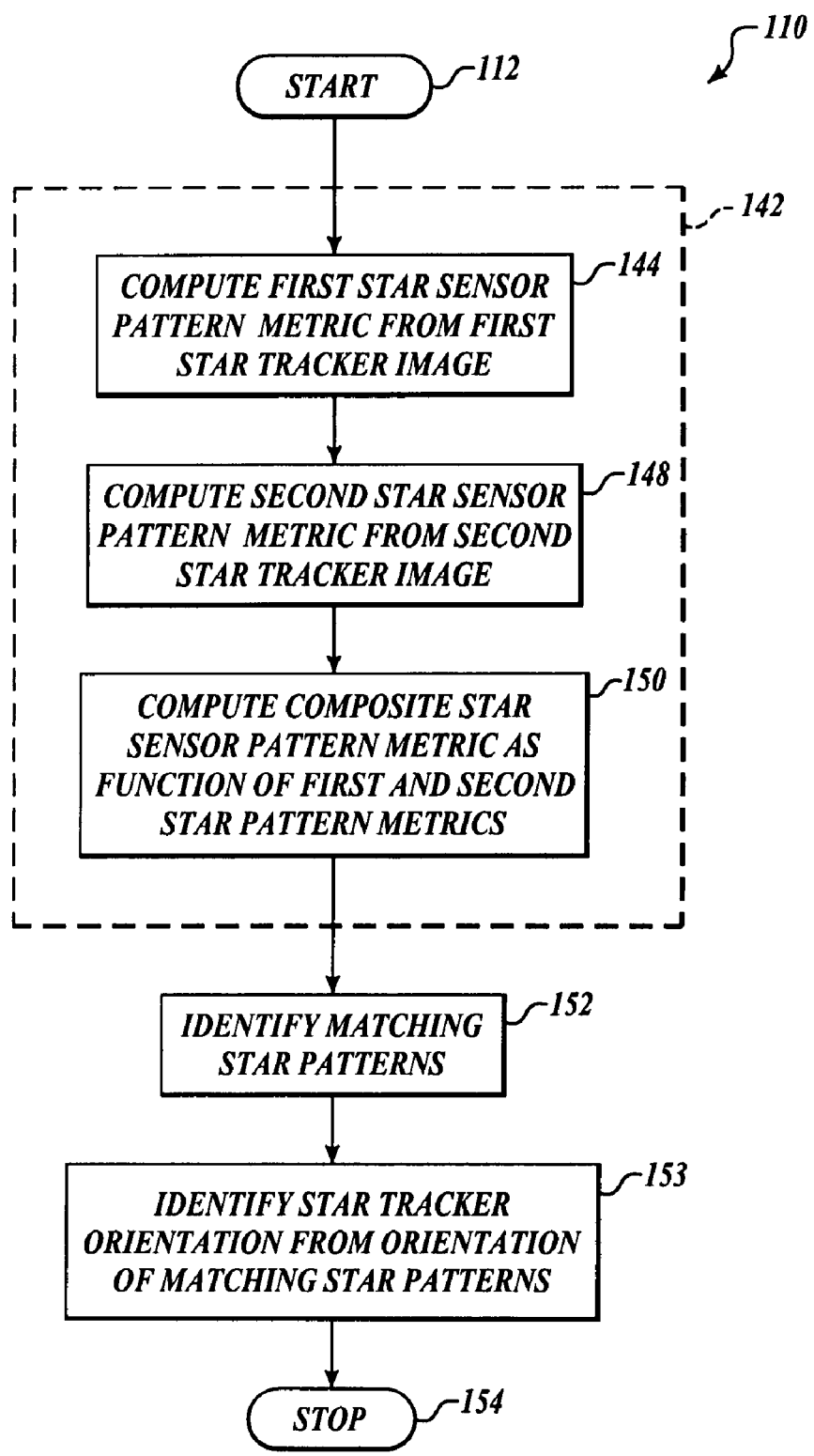
FIG. 7 is a flow chart of an exemplary method of identifying a star tracker orientation in space.

Referring now to FIG. 7, an exemplary method 110 is provided for identifying a star tracker orientation in space. The method 110 builds upon processing of star patterns discussed above for the method 10 (FIG. 1). To that end, the method 110 starts at a block 112. At a block 142, metrics of a feature of a star pattern, such as the star pattern 40 (FIGS. 4A and 4B), are computed from a set of star tracker images $46_A$, $46_B$, and, if desired, additional star tracker images $46_C$ through $46_N$ (FIG. 5). Processing at the block 142 results in computation of a composite metric of the feature of the star pattern.

At a block 144, a metric of a feature of a star pattern in a star tracker image $46_A$ is computed. As discussed above, the star pattern metrics are functions of the locations and/or intensities of multiple stars. An exemplary metric is separation between star pairs. Given by way of non-limiting example and referring additionally to FIG. 5, a numerical value used for a separation metric AB could be proportional to an angle θ (in radians) between the unit vectors to star A and star B, cosine(θ), sine(θ), 2 sine(θ/2), tangent(θ), (sine(θ))², (cosine(θ))², or another suitable function of θ.

As also discussed above, another exemplary star pattern metric is an included angle in star triplets. The included angle may be a spherical angle between great circle arcs (see FIG. 4A) or a planar angle (see FIG. 4B) between vectors. Given by way of non-limiting example, a number used for an interior angle metric could be proportional to the spherical angle α (FIG. 4A) between great circle arcs AB and AC or to the planar angle a (FIG. 4B) between vectors B-A and C-A. Similarly, the number could be proportional to cosine(α), cosine(a), sine(α), sine(a), 2 sine(α/2), 2 sine(a/2), tangent (α), tangent(a), (sine(α))², (sine(a))², (cosine(α))², or (cosine (a))². Further, and as discussed above, spherical area, spherical second moment (such as the spherical polar moment), planar area, planar second moment (such as the planar polar moment), singular values, convex hull of star polygons, and "feature vectors" may be used for star pattern matching, as desired.

At a block 148, the metric that was computed for the star pattern feature in the star tracker image $46_A$ is computed for the same feature in the star tracker image $46_B$. In this example, the star tracker image $46_B$ is a later frame from star sensor images of the star pattern. If desired, at the block 148 the metric that was computed for the star pattern feature in the star tracker image $46_A$ may be computed for the same star pattern feature in additional star tracker images, such as the star tracker image $46_C$. The metric for the star pattern feature may be computed for as many additional star tracker images $46_N$ as desired.

At a block 150, a composite metric of the feature of the star pattern is computed as a function of the metrics of the feature from the star tracker images $46_A$ and $46_B$ (and optionally any additional star tracker images $46_C$ through $46_N$, as desired). As discussed above, the function suitably is a filter function that may implement an average, such as a simple average or a weighted average. Additional filtering that may be performed implements an outlier filter, such as a median filter, to remove outliers. Further, the filter may assess variance of uncorrelated errors in the metric. Thus, the metrics have already been computed in each star tracker image 46A and 46B at the blocks 144 and 148 (and, if desired any additional star tracker images 46C through 46N), and it is at the block 150 that filtering is applied to the metrics (instead of computing metrics from filtered star tracker image features). As discussed above, if desired, at the block 150 star pattern metrics that are not available in any single star tracker image frame may be combined. For example, the properties of a triangle formed by three stars can be assembled even though only two of the three stars were marked valid in any single frame. Then the refined metrics are made available to subsequent star pattern recognition processing.

At a block 152, matching star patterns are identified. The composite metric computed at the block 150 of the star pattern feature is compared against reference star pattern metrics. As discussed above, star pattern recognition processing at the block 152 may be any acceptable known star pattern recognition processing, and it would be desirable for the star pattern recognition processing at the block 152 to take advantage of metric measurement error assessment to determine if the identified pattern meets the desired level of confidence. Exemplary star pattern recognition processing that may be performed at the block 152 has been discussed above for the block 52 of the method 10 (FIG. 1). In the interest of brevity, these details need not be repeated.

At a block 153, star tracker orientation is identified from orientation of the matching star patterns. This is done using any acceptable known stellar attitude determination means. Exemplary methods are described in "Geoscience Laser Altimeter System (GLAS) Algorithm Theoretical Basis Document Version 2.2: Precision Attitude Determination (PAD)" by Sungkoo Bae and Bob E. Schutz, Center for Space Research, The University of Texas at Austin, October 2002, the contents of which are hereby incorporated by reference.

Figure 8:
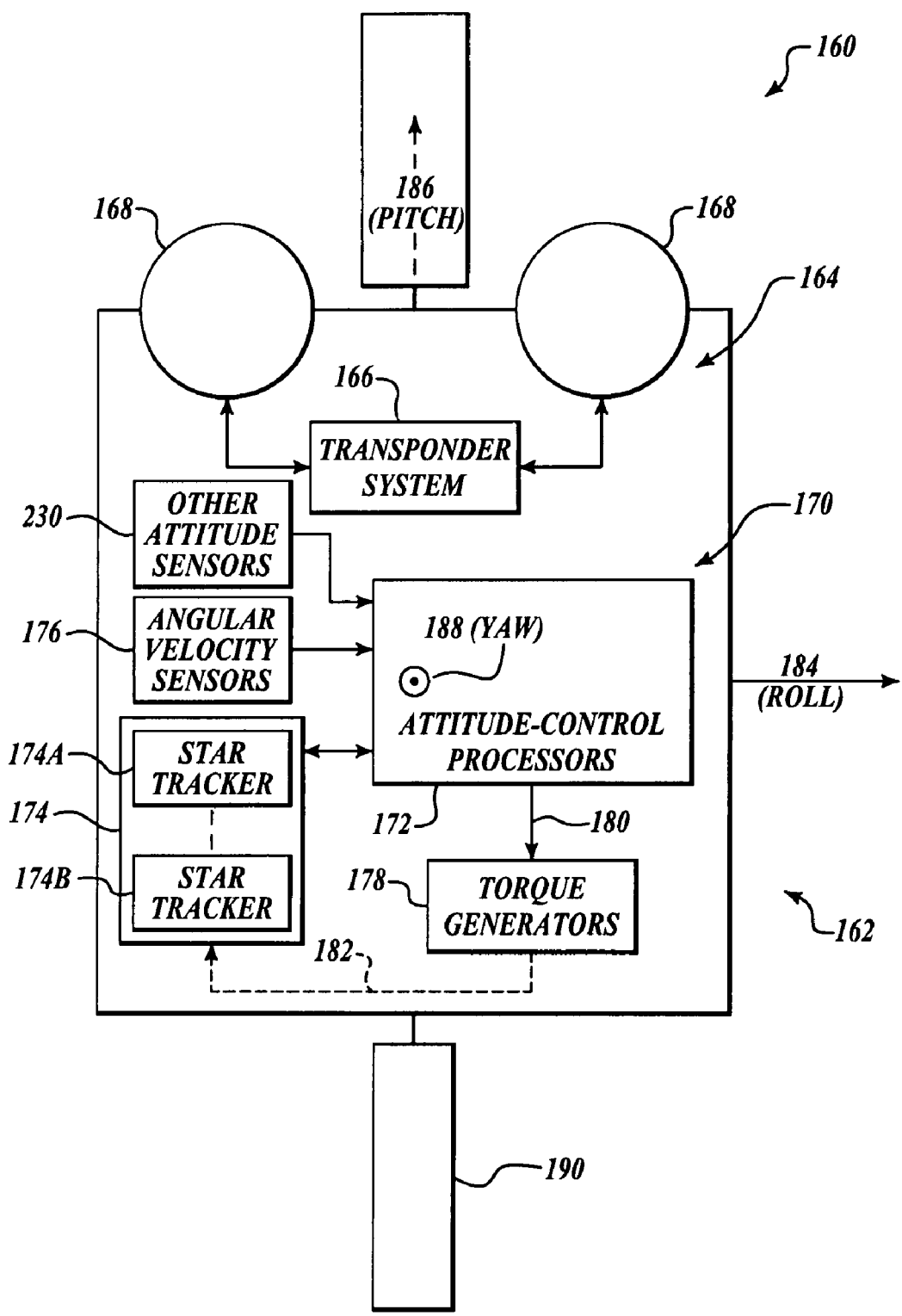
FIG. 8 is a block diagram of an exemplary spacecraft.

Referring now to FIG. 8 and given by way of non-limiting example, a spacecraft 160 provides an exemplary host environment in which the method 110 (FIG. 7) can be executed. The spacecraft 160 can be any type of spacecraft as desired. Given by way of non-limiting example, the spacecraft suitably may be a satellite, such as a communications satellite, navigation satellite, earth observation satellite, or scientific satellite, a launch vehicle, such as a submarine-launched missile, a manned spacecraft, or an interplanetary probe. The following description of the spacecraft 160 is adapted from U.S. Pat. No. 6,766,227, which is assigned to The Boeing Company, the assignee of this patent application, and the contents of which are incorporated by reference The spacecraft 160 has a body 162 that carries an exemplary service system in the form, for example, of a communication system 164. The communication system 164 provides services (e.g., communication services) to a service area on the earth with a transponder system 166 that interfaces with antennas 168. This service can only be effected if the spacecraft is controlled to have a service attitude.

Accordingly, the body 162 also carries an attitude determination and control system 170 which includes attitude-control processors 172, a star sensor system 174 that includes at least one star sensor 174A and may include at least one other star sensor 174B, angular velocity sensors 176, other attitude sensors 230, and torque generators 178. In response to attitude sense signals from the star sensor system 174 and the angular velocity sensors 176, the attitude-control processors 172 generate control signals 180.

In response to the control signals 180, the torque generators 178 induce torques in the body 162 which cause it to assume a commanded attitude (e.g., the spacecraft's service attitude). Because their torques alter the attitude of the body 162, the torque generators 178 effectively generate a feedback path 182 that alters attitude sense signals of the star sensor system 174 and the angular velocity sensors 176.

Attitude of the spacecraft 160 can be defined with reference to a body-centered coordinate system that comprises a roll axis 184, a pitch axis 186, and a yaw axis 188 (directed towards the viewer). The systems of the spacecraft 160 suitably are powered with electrical power that is generated, for example, by at least one solar panel 190.

Figure 9:
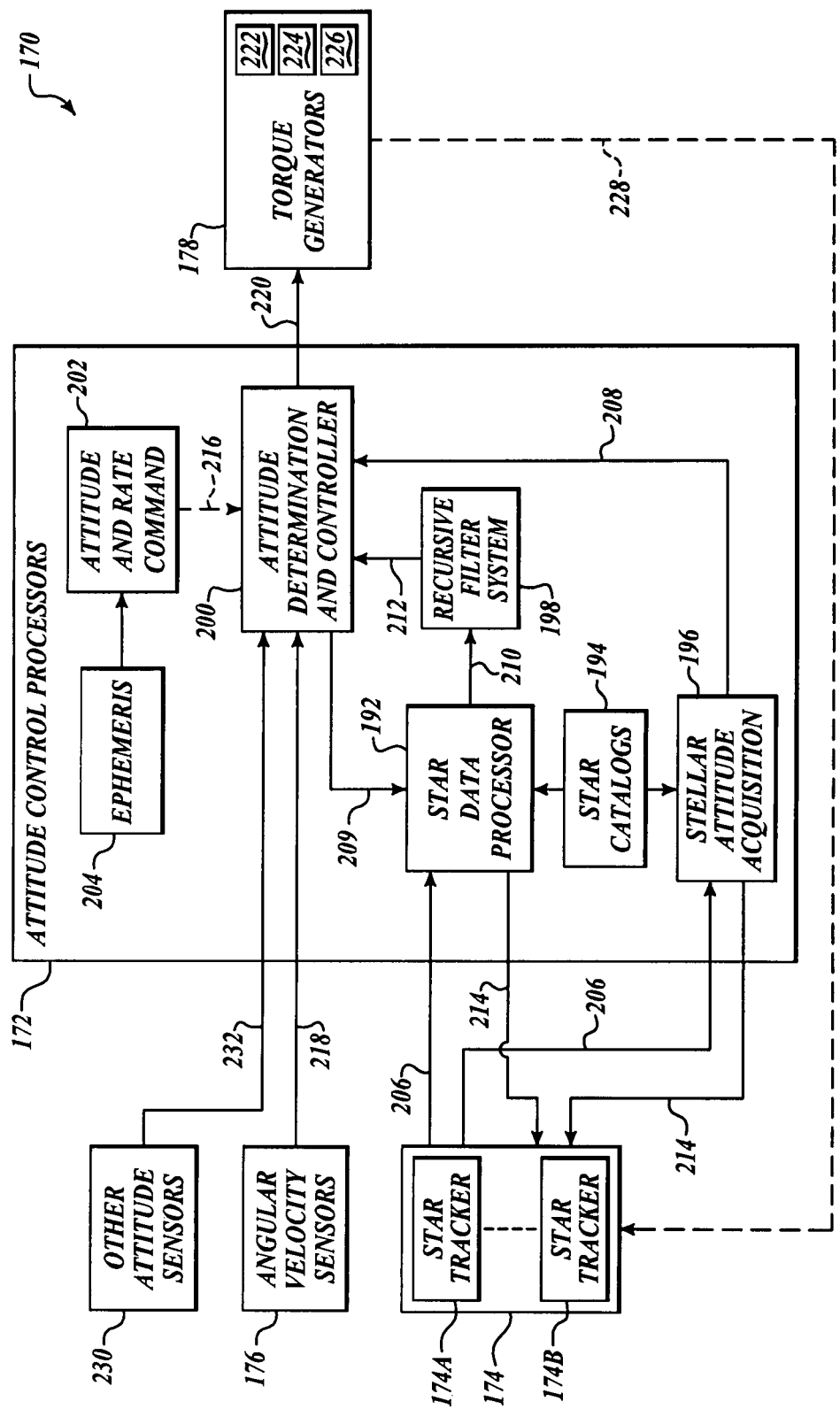
FIG. 9 is a block diagram of an exemplary system for executing the method of FIG. 7.

Referring now to FIG. 9, in one exemplary embodiment the attitude-control processors 172 of the attitude determination and control system 170 include a star data processor 192, at least one star catalog 194, a stellar attitude acquisition system 196, a recursive filter system 198, an attitude determination and controller 200, an attitude and rate command section 202, and an ephemeris determination system 204.

The stellar attitude acquisition system 196 receives star sensor signals 206 from the star sensor system 174 and accesses data from the star catalogs 194 to thereby identify the stars that generated the star-sensor signals 206. If this identification is successful, the stellar attitude acquisition system 196 provides an initial attitude estimate 208 to the attitude determination and controller 200. Thus, in this embodiment the stellar attitude acquisition block 196 performs processing of the block 142 (that is, the blocks 144, 148, and 150) and the block 152 of the method 110 (all FIG. 7).

The star data processor 192 also receives star sensor signals 206 from the star sensor system 174 and has access to data from the star catalogs 194. Once the attitude determination and controller 200 receives the initial attitude estimate 208, the attitude determination and controller 200 provides attitude updates 209 to the star data processor 192. The star data processor 192 generates star measurement signals 210 without requiring star pattern matching. The star measurement signals 210 from the star data processor 192 are processed by the recursive filter system 198 into subsequent attitude estimates 212 which are then provided to the attitude determination and controller 200. The star data processor 192 and the stellar attitude acquisition system 196 couple tracked-star commands 214 to the star sensor system 174 to thereby control which stars are tracked by the star sensors 174A and 174B.

With access to ephemeris data 204 (e.g., earth and sun locations), the attitude and rate command 202 provides a commanded attitude 216 to the attitude determination and controller 200 which also receives rate signals 218 from the angular velocity sensors 176. In response, the attitude determination and controller 200 delivers torque command signals 220 to the torque generators 178 (e.g., thrusters 222, momentum wheels 224, and magnetic torquers 226). The resultant torque induces rotation of the spacecraft body 162 (FIG. 8) which forms an effective feedback rotation signal 228 that is sensed by the star sensor system 174, angular velocity sensors 176, and any other attitude sensors 230 (e.g., sun sensor, earth sensor, magnetometer, beacon sensor) that provide other sense signals 232 to the attitude determination and controller 200.

It may be desirable to reduce memory requirements onboard the spacecraft because of the high costs of radiation-hardened memory. For example, a typical star pattern recognition database may entail on the order of around 60 Kbytes of storage and a typical star pattern catalogue may entail on the order of around 100 Kbytes. It may also be desirable to perform some processing off board the spacecraft in order to reduce weight and power consumption.

To that end and referring now to FIG. 10, a system 260 provides an exemplary host environment off board a spacecraft 261 for hosting processing and storage entailed in executing the method 110 (FIG. 7). The spacecraft 261 can be any type of spacecraft as desired. The system 260 can be hosted in any off board setting, such as in a ground station or onboard a mobile platform such as an aircraft, a maritime vessel, or the like.

Star pattern metrics are computed as described above for the star tracker images $46_A$ and $46_B$ (and any additional star tracker images $46_C$ through $46_N$) (FIG. 5) and are transmitted via radiofrequency signals by the spacecraft 261 to an antenna 263 that is part of the system 260. Alternately, the star tracker images $46_A$ and $46_B$ (and any additional star tracker images $46_C$ through $46_N$) (FIG. 5) may be transmitted by the spacecraft 261. A transceiver 265 receives the radiofrequency signals from the antenna 263, demodulates and/or decodes the radiofrequency signals, and provides baseband signals to an input/output interface 262. The input/output interface 262 provides suitably formatted signals to a processor 264. The processor 264 executes processing of the block 150 (FIG. 7) to compute the composite star pattern metric. Alternately, the processor 264 executes processing of the block 142 (FIG. 7) to compute the individual metrics and the composite star pattern metric when signals of the images are transmitted by the spacecraft 261. The processor 264 accesses star patterns from a star pattern catalogue 266 and star pattern metrics from a pattern recognition database 268 to execute processing of the block 152 to identify matching star patterns. The identified matching star patterns are provided to the transceiver 265 via the input/output interface 262 and transmitted to the spacecraft 261 via the antenna 263. Further processing may be performed as discussed above in reference to FIGS. 8 and 9.

In various embodiments, portions of the system and method include a computer program product. The computer program product includes a computer-readable storage medium, such as the non-volatile storage medium, and computer-readable program code portions, such as a series of computer instructions, embodied in the computer-readable storage medium. Typically, the computer program is stored and executed by a processing unit or a related memory device, such as the processor 64 (FIG. 6), the stellar attitude acquisition 196 (FIG. 9), or the processor 264 (FIG. 10).

In this regard, FIGS. 1 and 6-10 are block diagrams and flowcharts of methods, systems and program products according to various embodiments. It will be understood that each block of the block diagrams and flowcharts and combinations of blocks in the block diagrams and flowcharts can be implemented by computer program instructions. These computer program instructions may be loaded onto a computer or other programmable apparatus to produce a machine, such that the instructions which execute on the computer or other programmable apparatus create means for implementing the functions specified in the block diagrams or flowchart blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the block diagrams or flowchart blocks. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block diagrams or flowchart blocks.

Accordingly, blocks of the block diagrams or flowcharts support combinations of means for performing the specified functions, combinations of steps for performing the specified functions and program instruction means for performing the specified functions. It will also be understood that each block of the block diagrams or flowcharts, and combinations of blocks in the block diagrams or flowcharts, can be implemented by special purpose hardware-based computer systems which perform the specified functions or steps, or combinations of special purpose hardware and computer instructions.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method of recognizing a pattern from digitized images, the method comprising:
   computing a first image metric from a first digitally-captured image;
   computing a second image metric from a second digitally-captured image;
   computing a composite image metric as a function of the first image metric and the second image metric; and
   identifying, by a processor, a pattern by comparing the composite image metric against a reference image metric.

2. The method of claim 1, wherein the function includes a simple average.

3. The method of claim 1, wherein the function includes a weighted average.

4. The method of claim 1, wherein at least one of the first image metric and the second image metric includes a separation distance between a first feature and a second feature.

5. The method of claim 1, wherein at least one of the first image metric and the second image metric includes a measured area of a feature.

6. The method of claim 1, wherein:
   a first arc joins a first feature and a second feature;
   a second arc joins the first feature and a third feature; and
   at least one of the first image metric and the second image metric includes a central angle between the first arc and the second arc.

7. The method of claim 1, wherein:
   a first feature, a second feature, and a third feature define vertices of a polygon; and
   at least one of the first image metric and the second image metric includes an area of the polygon.

8. The method of claim 7, wherein the polygon includes a triangle.

9. The method of claim 1, wherein:
   a first feature, a second feature, and a third feature define vertices of a polygon; and
   at least one of the first image metric and the second image metric includes a second moment of the polygon.

10. The method of claim 1, further comprising:
    computing a third image metric from a third digitally-captured image; and
    wherein the composite image metric is computed as a function of the first, second, and third image metrics.

11. The method of claim 1, further comprising:
identifying an outlier feature with an outlier filter; and
wherein the function ignores the identified outlier feature.

12. The method of claim 11, wherein the outlier filter includes a median filter.

13. The method of claim 1, wherein the first and second digitally-captured images include friction ridge images.

14. The method of claim 1, wherein the first and second digitally-captured images include iris images.

15. The method of claim 1, wherein the first and second digitally-captured images include star pattern images.

16. A method of identifying a star tracker orientation in space, the method comprising:
computing a first star pattern metric from a first digitally-captured star tracker image;
computing a second star pattern metric from a second digitally-captured star tracker image;
computing a composite star pattern metric as a function of the first star pattern metric and the second star pattern metric;
identifying matching star patterns by comparing the composite star pattern metric against reference star pattern metrics computed from a star catalogue; and
identifying, by a processor, orientation of a star tracker from orientation of the matching star patterns.

17. The method of claim 16, wherein the function includes a simple average.

18. The method of claim 16, wherein the function includes a weighted average.

19. The method of claim 16, wherein at least one of the first star pattern metric and the second star pattern metric includes a separation distance between a first star and a second star.

20. The method of claim 16, wherein at least one of the first star pattern metric and the second star pattern metric includes a measured brightness of a star.

21. The method of claim 16, wherein:
a first arc joins a first star and a second star;
a second arc joins the first star and a third star; and
at least one of the first star pattern metric and the second star pattern metric includes a central angle between the first arc and the second arc.

22. The method of claim 16, wherein:
a first star, a second star, and a third star define vertices of a polygon; and
at least one of the first star pattern metric and the second star pattern metric includes an area of the polygon.

23. The method of claim 22, wherein the polygon includes a triangle.

24. The method of claim 16, wherein:
a first star, a second star, and a third star define vertices of a polygon; and
at least one of the first star pattern metric and the second star pattern metric includes a second moment of the polygon.

25. The method of claim 16, further comprising:
computing a third star pattern metric from a third digitally-captured star tracker image; and
wherein the composite star pattern metric is computed as a function of the first, second, and third star pattern metrics.

26. The method of claim 16, further comprising:
identifying an outlier feature with an outlier filter; and
wherein the function ignores the identified outlier feature.

27. The method of claim 26, wherein the outlier filter includes a median filter.

28. A system for recognizing a pattern from digitized images, the system comprising:
an input interface; and
a processor operatively coupled to the input interface, the processor configured to:
compute a first image metric from a first digitally-captured image;
compute a second image metric from a second digitally-captured image;
compute a composite image metric as a function of the first image metric and the second image metric; and
identify a pattern by comparing the composite image metric against a reference image metric.

29. The system of claim 28, further comprising:
a pattern catalogue that includes a plurality of reference image metrics; and
a pattern recognition database.

30. The system of claim 28, wherein the function includes a simple average.

31. The system of claim 28, wherein the function includes a weighted average.

32. The system of claim 28, wherein at least one of the first image metric and the second image metric includes a separation distance between a first feature and a second feature.

33. The system of claim 28, wherein at least one of the first image metric and the second image metric includes a measured area of a feature.

34. The system of claim 28, wherein:
a first arc joins a first feature and a second feature;
a second arc joins the first feature and a third feature; and
at least one of the first image metric and the second image metric includes a central angle between the first arc and the second arc.

35. The system of claim 28, wherein:
a first feature, a second feature, and a third feature define vertices of a polygon; and
at least one of the first image metric and the second image metric includes an area of the polygon.

36. The system of claim 35, wherein the polygon includes a triangle.

37. The system of claim 28, wherein:
a first feature, a second feature, and a third feature define vertices of a polygon; and
at least one of the first image metric and the second image metric includes a second moment of the polygon.

38. The system of claim 28, wherein:
the processor is further configured to compute a third image metric from a third digitally-captured image; and
wherein the composite image metric is computed as a function of the first, second, and third image metrics.

39. The system of claim 28, further comprising
an outlier filter executable by the processor, the outlier filter configured to identify an outlier feature; and
wherein the function ignores the identified outlier feature.

40. The system of claim 39, wherein the outlier filter includes a median filter.

41. The system of claim 28, wherein the first and second digitally-captured images include friction ridge images.

42. The system of claim 28, wherein the first and second digitally-captured images include iris images.

43. The system of claim 28, wherein the first and second digitally-captured images include star pattern images.

44. A system for identifying a star tracker orientation in space, the system comprising:
- an input interface; and
- a processor operatively coupled to the input interface, the processor configured to:
  - compute a first star pattern metric from a first digitally-captured star tracker image;
  - compute a second star pattern metric from a second digitally-captured star tracker image;
  - compute a composite star pattern metric as a function of the first star pattern metric and the second star pattern metric;
  - identify a matching star pattern by comparing the composite star pattern metric against a reference star pattern metric; and
  - identify orientation of a star tracker from orientation of the matching star pattern.

45. The system of claim 44, further comprising:
- a star pattern catalogue that includes a plurality of reference image metrics; and
- a star pattern recognition database.

46. The system of claim 44, wherein the function includes a simple average.

47. The system of claim 44, wherein the function includes a weighted average.

48. The system of claim 44, wherein at least one of the first star pattern metric and the second star pattern metric includes a separation distance between a first star and a second star.

49. The system of claim 44, wherein at least one of the first star pattern metric and the second star pattern metric includes a measured brightness of a star.

50. The system of claim 44, wherein:
- a first arc joins a first star and a second star;
- a second arc joins the first star and a third star; and
- at least one of the first star pattern metric and the second star pattern metric includes a central angle between the first arc and the second arc.

51. The system of claim 44, wherein:
- a first star, a second star, and a third star define vertices of a polygon; and
- at least one of the first star pattern metric and the second star pattern metric includes an area of the polygon.

52. The system of claim 51, wherein the polygon includes a triangle.

53. The system of claim 44, wherein:
- a first star, a second star, and a third star define vertices of a polygon; and
- at least one of the first star pattern metric and the second star pattern metric includes a second moment of the polygon.

54. The system of claim 44, wherein:
- the processor is further configured to compute a third star pattern metric from a third digitally-captured star tracker image; and
- wherein the composite star pattern metric is computed as a function of the first, second, and third star pattern metrics.

55. The system of claim 44, further comprising:
- an outlier filter executable by the processor, the outlier filter configured to identify an outlier feature; and
- wherein the function ignores the identified outlier feature.

56. The system of claim 55, wherein the outlier filter includes a median filter.

57. The system of claim 44, further comprising:
- a transceiver operatively coupled to the input interface; and
- an antenna operatively coupled to the transceiver, the antenna being configured to communicate via radiofrequency communications with a spacecraft.

58. A non-transitory computer-readable memory device comprising instructions that, when executed by a processor, cause the processor to:
- compute a first image metric from a first digitally-captured image;
- compute a second image metric from a second digitally-captured image;
- compute a composite image metric as a function of the first image metric and the second image metric; and
- identify a pattern by comparing the composite image metric against a reference image metric.

59. The non-transitory computer-readable memory device of claim 58, wherein the function includes a simple average.

60. The non-transitory computer-readable memory device of claim 58, wherein the function includes a weighted average.

61. The non-transitory computer-readable memory device of claim 58, wherein at least one of the first image metric and the second image metric includes a separation distance between a first feature and a second feature.

62. The non-transitory computer-readable memory device of claim 58, wherein at least one of the first image metric and the second image metric includes a measured area of a feature.

63. The non-transitory computer-readable memory device of claim 58, wherein:
- a first arc joins a first feature and a second feature;
- a second arc joins the first feature and a third feature; and
- at least one of the first image metric and the second image metric includes a central angle between the first arc and the second arc.

64. The non-transitory computer-readable memory device of claim 58, wherein:
- a first feature, a second feature, and a third feature define vertices of a polygon; and
- at least one of the first image metric and the second image metric includes an area of the polygon.

65. The non-transitory computer-readable memory device of claim 64, wherein the polygon includes a triangle.

66. The non-transitory computer-readable memory device of claim 58, wherein:
- a first feature, a second feature, and a third feature define vertices of a polygon; and
- at least one of the first image metric and the second image metric includes a second moment of the polygon.

67. The non-transitory computer-readable memory device of claim 58, further comprising:
- instructions that are executable by the processor to cause the processor to compute a third image metric from a third digitally-captured image; and
- wherein the composite image metric is computed as a function of the first, second, and third image metrics.

68. The non-transitory computer-readable memory device of claim 58, further comprising:
- instructions that are executable by the processor to cause the processor to identify an outlier feature with an outlier filter; and
- wherein the function ignores the identified outlier feature.

69. The non-transitory computer-readable memory device of claim 68, wherein the outlier filter includes a median filter.

70. The non-transitory computer-readable memory device of claim 58, wherein the first and second digitally-captured images include friction ridge images.

71. The non-transitory computer-readable memory device of claim 58, wherein the first and second digitally-captured images include iris images.

72. The non-transitory computer-readable memory device of claim 58, wherein the first and second digitally-captured images include star pattern images.

73. A non-transitory computer-readable memory device comprising instructions that, when executed by a processor, cause the processor to:
compute a first star pattern metric from a first digitally-captured star tracker image;
compute a second star pattern metric from a second digitally-captured star tracker image;
compute a composite star pattern metric as a function of the first star pattern metric and the second star pattern metric;
identify matching star patterns by comparing the composite star pattern metric against reference star pattern metrics computed from a star catalogue; and
identify orientation of a star tracker from orientation of the matching star patterns.

74. The non-transitory computer-readable memory device of claim 73, wherein the function includes a simple average.

75. The non-transitory computer-readable memory device of claim 73, wherein the function includes a weighted average.

76. The non-transitory computer-readable memory device of claim 73, wherein at least one of the first star pattern metric and the second star pattern metric includes a separation distance between a first star and a second star.

77. The non-transitory computer-readable memory device of claim 73, wherein at least one of the first star pattern metric and the second star pattern metric includes a measured brightness of a star.

78. The non-transitory computer-readable memory device of claim 73, wherein:
a first arc joins a first star and a second star;
a second arc joins the first star and a third star; and
at least one of the first star pattern metric and the second star pattern metric includes a central angle between the first arc and the second arc.

79. The non-transitory computer-readable memory device of claim 73, wherein:
a first star, a second star, and a third star define vertices of a polygon; and
at least one of the first star pattern metric and the second star pattern metric includes an area of the polygon.

80. The non-transitory computer-readable memory device of claim 79, wherein the polygon includes a triangle.

81. The non-transitory computer-readable memory device of claim 73, wherein:
a first star, a second star, and a third star define vertices of a polygon; and
at least one of the first star pattern metric and the second star pattern metric includes a second moment of the polygon.

82. The non-transitory computer-readable memory device of claim 73, further comprising:
instructions that are executable by the processor to cause the processor to compute a third star pattern metric from a third digitally-captured star tracker image; and
wherein the composite star pattern metric is computed as a function of the first, second, and third star pattern metrics.

83. The non-transitory computer-readable memory device of claim 73, further comprising:
instructions that are executable by the processor to cause the processor to identify an outlier feature with an outlier filter; and
wherein the function ignores the identified outlier feature.

84. The non-transitory computer-readable memory device of claim 83, wherein the outlier filter includes a median filter.

85. A spacecraft comprising:
a spacecraft body;
at least one star tracker that is coupled with a known spatial relationship to the spacecraft body;
a processor operatively coupled to the star tracker, the processor configured to:
compute a first star pattern metric from a first digitally-captured star tracker image;
compute a second star pattern metric from a second digitally-captured star tracker image;
compute a composite star pattern metric as a function of the first star pattern metric and the second star pattern metric;
identify a matching star pattern by comparing the composite star pattern metric against a reference star pattern metric; and
identify orientation of a star tracker from orientation of the matching star pattern; and
a torque generation system that is physically coupled to the spacecraft body and operatively coupled to the processor, the torque generation system configured to alter attitude of the spacecraft with generated torque responsive to orientation identified by the processor.

86. The spacecraft of claim 85, further comprising:
a star pattern catalogue that includes a plurality of reference image metrics; and
a star pattern recognition database.

87. The spacecraft of claim 85, wherein the function includes a simple average.

88. The spacecraft of claim 85, wherein the function includes a weighted average.

89. The spacecraft of claim 85, wherein at least one of the first star pattern metric and the second star pattern metric includes a separation distance between a first star and a second star.

90. The spacecraft of claim 85, wherein at least one of the first star pattern metric and the second star pattern metric includes a measured brightness of a star.

91. The spacecraft of claim 85, wherein:
a first arc joins a first star and a second star;
a second arc joins the first star and a third star; and
at least one of the first star pattern metric and the second star pattern metric includes a central angle between the first arc and the second arc.

92. The spacecraft of claim 85, wherein:
a first star, a second star, and a third star define vertices of a polygon; and
at least one of the first star pattern metric and the second star pattern metric includes an area of the polygon.

93. The spacecraft of claim 92, wherein the polygon includes a triangle.

94. The spacecraft of claim 85, wherein:
a first star, a second star, and a third star define vertices of a polygon; and
at least one of the first star pattern metric and the second star pattern metric includes a second moment of the polygon.

95. The spacecraft of claim 85, wherein:
the processor is further configured to compute a third star pattern metric from a third digitally-captured star tracker image; and
wherein the composite star pattern metric is computed as a function of the first, second, and third star pattern metrics.

96. The spacecraft of claim 85, wherein:
the processor further configured to implement an outlier filter to identify an outlier feature; and
the function ignores the identified outlier feature.

97. The spacecraft of claim 96, wherein the outlier filter includes a median filter.

98. The spacecraft of claim 85, wherein the spacecraft includes a spacecraft chosen from a group including a satellite and a launch vehicle.

* * * * *